Feb. 17, 1959     T. S. GATES ET AL     2,873,652
MACHINE FOR SHAVING HERRINGBONE GEARS
Filed Nov. 20, 1956     2 Sheets-Sheet 1
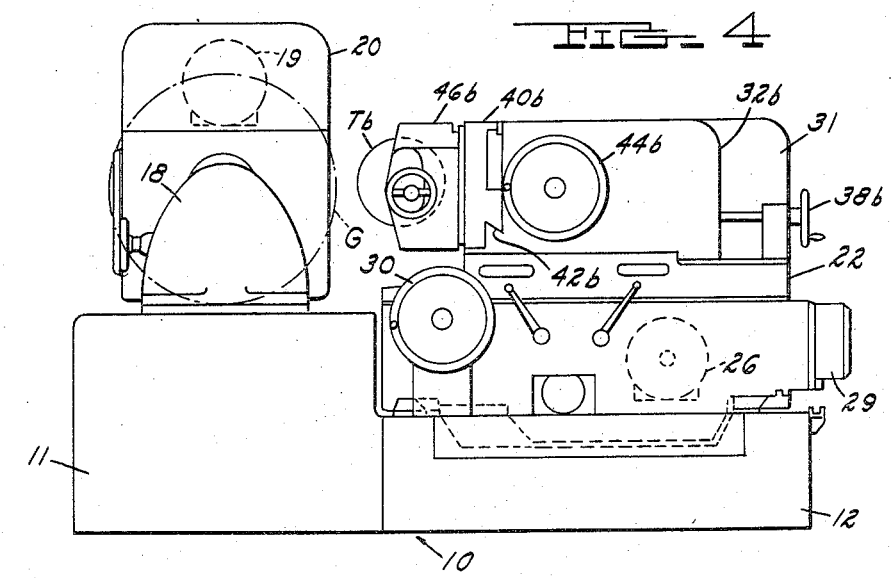
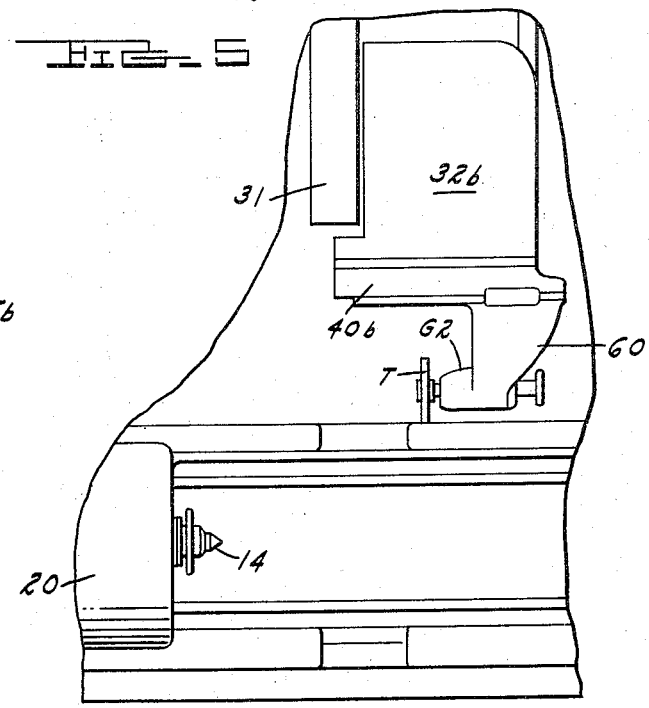
INVENTORS
THOMAS S. GATES
ARTHUR B. BASSOFF
BY KENNETH J. DAVIS
Whittemore, Hulbert
& Belknap ATTORNEYS

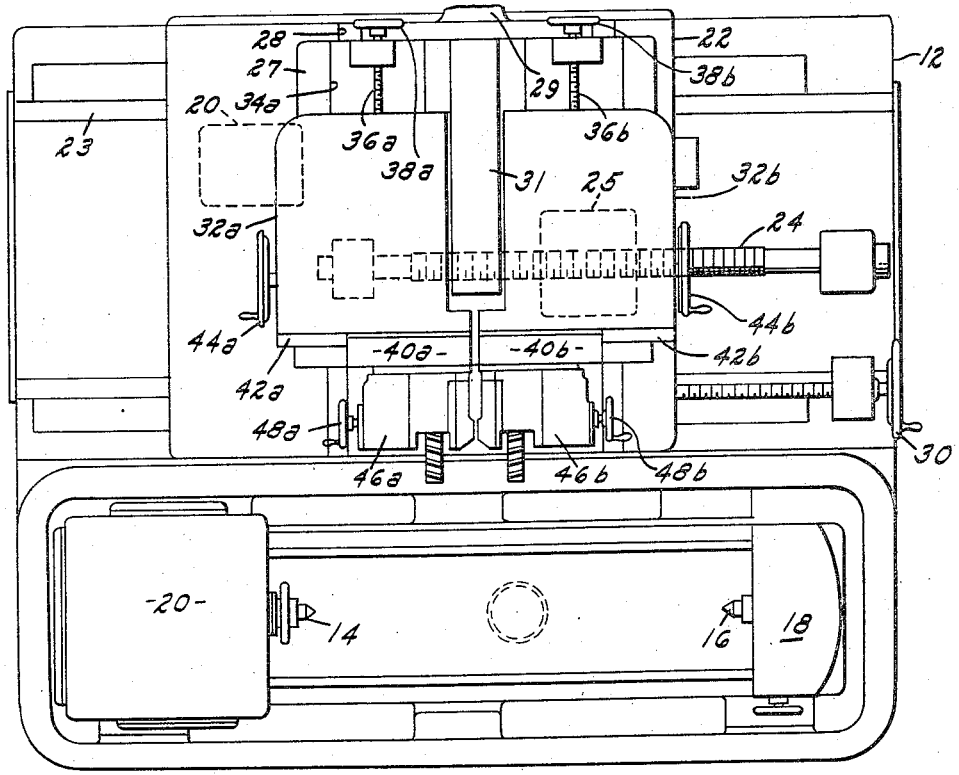
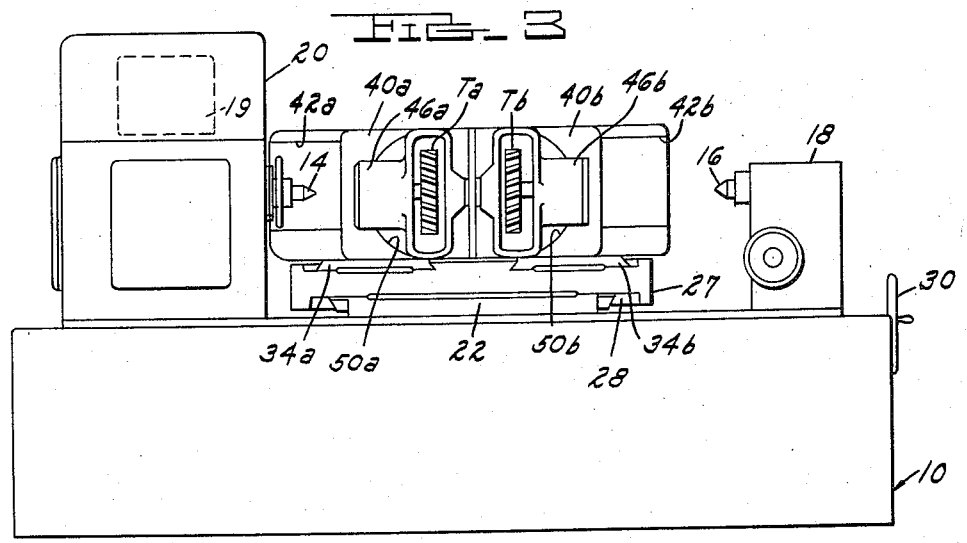

United States Patent Office 2,873,652
Patented Feb. 17, 1959

2,873,652

MACHINE FOR SHAVING HERRINGBONE GEARS

Thomas S. Gates, Grosse Pointe Woods, and Arthur B. Bassoff and Kenneth J. Davis, Detroit, Mich., assignors to National Broach & Machine Company, Detroit, Mich., a corporation of Michigan Application November 20, 1956, Serial No. 623,432

7 Claims. (Cl. 90—1.6)

The present invention relates to a machine for shaving herringbone gears.

It is an object of the present invention to provide a machine for shaving herringbone gears having two cutter heads adapted to be relatively adjusted parallel to the axis of a work gear to accommodate herringbone or double helical gears of different width and relatively adjustable radially of the axis of the work gear to render either of the cutter heads selectively operable for performing a finishing operation concurrently with or separately from the other cutter head.

More specifically, it is a feature of the present invention to provide a machine for finishing herringbone or double helical gears comprising a frame, a rotary work support on the frame, a cross slide movable on the frame parallel to the axis of the work support, a feed slide movable on the cross slide toward and away from the work support in a direction perpendicular to the axis thereof, a pair of main cutter slides mounted on the feed slide for independent adjustment thereon perpendicularly toward and away from the axis of the work support, tool sub-slides respectively mounted on the main tool slides for independent adjustment in a direction substantially parallel to the axis of the work support, and tool heads carried respectively by said tool sub-slides for independent angular adjustment about axes radial of the work support axis.

Other objects and features of the invention will become apparent as the description proceeds, especially when taken in conjunction with the accompanying drawings, illustrating preferred embodiments of the invention, wherein:

Figure 1 is a diagrammatic view illustrating the relationship between a pair of gear finishing tools with both toothed portions of a herringbone or double helical gear.

Figure 2 is a front elevational view of a gear finishing machine of the character described.

Figure 3 is a plan view of the machine shown in Figure 1.

Figure 4 is a side elevation of the machine shown in Figure 1.

Figure 5 is a fragmentary elevational view of an adaptation of the machine to permit finishing of internal herringbone or double helical gears.

Referring first to Figure 1 there is illustrated the relationship between a pair of gear shaving tools Ta and Tb with the two toothed portions Ga and Gb of a herringbone or double helical gear G. The operation performed by the tools is a finishing operation in which the tools and toothed portions of the gear are rotated in mesh with their axes crossed in space as illustrated in Figure 1. In addition to the rotation relative traverse is provided in a direction to cause the finishing action of the tools to be distributed axially of the toothed portions of the herringbone gear from side to side thereof. Such relative traverse may conveniently be in a direction parallel to the axis of the gear G.

The tools employed in the operation may be shaving cutters in the form of gears having teeth conjugate to the teeth of the herringbone gear. Due to the crossed axes relationship it is of course necessary for the teeth of the tools to have helix angles different from that of the teeth of the herringbone gear. In order to perform a shaving action the teeth of the shaving cutters are provided with grooves or serrations extending up and down the flanks of the teeth and provided with cutting edges disposed in the working surfaces thereof.

Alternatively, the finishing operation may be carried out by other gear-like tools such for example as lapping tools, honing tools, or the like.

Herringbone gears are normally quite large and expensive and the present apparatus is devised for the purpose of providing a more rapid finishing operation and at the same time, a more accurate finishing operation in which either of the tools Ta or Tb may finish its associated toothed portion Ga or Gb while the other tool is in retracted inoperative position, or alternatively, in which the tools Ta and Tb can be operated simultaneously to finish the teeth on the sections Ga and Gb respectively.

In many cases it is desirable to have the tools Ta and Tb operating simultaneously to form a rough finishing operation. However, for the final finishing it is desirable to have only one of the tools operating at a time. In accordance with the present invention either of the tools may be retracted and the other tool left in its advanced operating position to perform a finishing operation on its associated toothed portion of the work gear G.

With the foregoing in mind, the construction of the novel gear finishing machine will be described. The machine comprises a base designated generally at 10 but formed of two castings 11 and 12. The base casting 11 constitutes a support for the relatively large work gear G whose outline is shown in dot and dash lines in Figure 4. The work gear G is supported between centers 14 and 16, the center 16 being mounted on the adjustable tailstock 18 and the center 14 being adapted to be driven in rotation by a motor 19 carried by a headstock 20.

The tool support base casting 12 carries a cross slide or saddle 22 mounted for traverse on hardened and ground ways 23 provided on the tool support base casting 12. The ways 23 extend parallel to the axis of the rotary work supporting structure including the centers 14 and 16. Means are provided for effecting slow traverse of the cross slide 22 along the ways, this means including a feed screw 24 and nut 25 connected between the base 12 and the cross slide 22. A motor 26 is connected by suitable mechanism (not shown) to the nut 25 for rotating the same in opposite directions to produce forward and reverse traverse strokes of the cross slide 22.

Mounted on the cross slide 22 for movement toward and away from the work support is a feed slide 27. The feed slide 27 is movable on ways 28 extending on the cross slide 22 in a direction perpendicular to the axis of the work support. Automatic incremental infeed mechanism is provided for effecting intermittent feed of the feed slide 27, this mechanism being indicated at 29. The automatic incremental infeed mechanism is operable to produce forward or infeeding movement of the feed slide 27 in timed relation to traverse movement of the cross slide 22. In the usual cycle, incremental infeed takes place at the ends of traverse strokes, normally one or more idle strokes without infeed being employed to complete the cycle. The infeed mechanism may include a feed screw and nut extending between the cross slide and feed slide and adapted to be intermittently energized for limited infeeding movement of the feed slide 27. In addition, manual means are provided for effecting quick and substantial movement of the feed slide 27, and this mechanism includes the hand wheel 30.

The feed slide 27 is provided with a forwardly extending stiffening rib 31 and at either side of the rib there is provided a main tool slide, these tool slides being designated 32a and 32b respectively. The slides are mounted for movement toward and away from the axis of the work support and specifically, along paths perpendicular thereto, the arrangement being such that the tools, later to be described, are movable radially of the axis of the work support. The main tool slides 32a and 32b are movable on ways indicated at 34a and 34b respectively, and are provided with means including feed screws 36a and 36b and hand wheels 38a and 38b for effecting independent adjustment of the slides 32a and 32b.

At the forward end of each of the main tool slides 32a and 32b respectively, are provided tool sub-slides 40a and 40b respectively. These sub-slides are mounted in horizontally extending ways 42a and 42b respectively and are connected to adjusting mechanism including hand wheels 44a and 44b for effecting independent adjustment of the sub-slides 40a and 40b in a direction parallel to the axis of the work support.

Carried at the forward end of each of the sub-slides 40a and 40b are tool heads 46a and 46b respectively, which are adapted to rotatably mount tools Ta and Tb respectively. The tool support heads 46a and 46b include hand wheels 48a and 48b respectively, suitably connected to the arbors or shafts supporting the tools Ta and Tb for effecting rotation thereof to cause them to mesh with the toothed sections Ga and Gb of the gear G.

Referring now to Figure 2 there are shown arcuate ways 50a and 50b on the sub-slides 40a and 40b by means of which the tool heads may be angularly adjusted about axes radial of the work support.

With the foregoing general description in mind it will be observed that with a work gear mounted between the centers 14 and 16 the tools Ta and Tb may in the first instance be adjusted to accommodate the width of the toothed sections Ga and Gb by rotation of the hand wheels 44a and/or 44b to adjust the axial spacing between the tools. Thereafter, the main tool slides 32a and 32b may be relatively adjusted to bring the corresponding tools Ta and Tb into the proper spacing with respect to the gear G so that both will operate simultaneously to finish to identical depth as the cross slide 22 is advanced.

It will be understood that each of the tool supporting heads 46a and 46b will have been angularly adjusted in accordance with the helix angles of the teeth of the herringbone gear and of the respective cutters to bring about proper meshing relation between the teeth. Actual meshing between the teeth of the gear and tools may be accomplished by manually feeding the feed slide 27 toward the work support and effecting such rotation of the tools Ta and Tb as is required to mesh, by employing hand wheels 48a and 48b. With the feed slide 27 in such forward position as to bring the tools in proper meshing relationship with the cutter, and with the main tool slides 32a and 32b and the tool sub-slides 40a and 40b properly adjusted, the automatic cycle of the machine may be started. The gear is positively driven in rotation and will drive the tools Ta and Tb as a result of the meshed engagement therebetween. Operation of the motor 26 results in slow traverse of the cross slide 22, causing the finishing action of the tools Ta and Tb to be distributed axially of the respective toothed sections Ga and Gb of the work gear G. Suitable means are provided for effecting reversal of the traverse of the cross slide and reversal of the direction of rotation of the work gear. The incremental infeed operates to effect incremental advance of the feed slide between successive traverse strokes, followed if desired by a predetermined number of final finishing traverse strokes without further infeed.

As an alternative, the present machine provides for the final finishing operation to be carried out independently on each of the toothed sections Ga and Gb and this may be accomplished by relatively moving the main tool slides 32a and 32b so that a selected one thereof is in advance of the other, and preferably, sufficiently in advance so that the tool on the other main tool slide is completely out of contact with the corresponding toothed section of the gear. Thereafter, a final finishing operation may be provided substantially as before described except that the operation is limited to action of the tool Ta on the gear section Ga for example, after which the relative position of the main tool slides is reversed and the teeth of the gear section Gb are finally finished by the tool Tb. In this way, any inaccuracies which might otherwise be produced by reaction on the shaving operation of one toothed section resulting from the shaving operation of the other toothed section is completely avoided.

In Figure 5 there is illustrated a modification of the present machine to provide for the finishing of internal herringbone or double helical gears. Like parts of the machine have identical reference numerals and will not be further described. The modification of the machine involves the substitution of a tool head 60 angularly adjustable on the tool sub-slide 40b and including a projecting spindle housing 62 adapted to support a finishing tool T in stub shaft supported relationship to permit the tool to be introduced into the interior of an internal gear.

The drawings and the foregoing specification constitute a description of the improved machine for shaving herringbone gears in such full, clear, concise and exact terms as to enable any person skilled in the art to practice the invention, the scope of which is indicated by the appended claims.

What we claim as our invention is:

1. A machine for finishing herringbone gears comprising a frame, a rotary work support on said frame for supporting a herringbone gear, a cross slide mounted on said frame for traverse substantially parallel to the axis of said work support, a feed slide mounted on said cross slide for movement thereon toward and away from said work support, a pair of main tool slides mounted on said feed slide for independent adjustment along parallel paths thereon toward and away from said work support, the amount of adjustment provided for said main tool slides being sufficient to move a gear-like tool carried by either completely out of mesh with the associated section of a herringbone gear work piece a tool sub-slide mounted on each of said main slides and independently adjustable thereon in a direction parallel to the axis of said work support, a rotary tool support on each of said tool sub-slides for supporting a gear-like finishing tool, means for driving one of said supports in rotation, and means for moving said cross slide in traverse strokes.

2. A machine for finishing herringbone gears comprising a frame, a rotary work support on said frame for supporting a herringbone gear, a cross slide mounted on said frame for traverse substantially parallel to the axis of said work support, a feed slide mounted on said cross slide for movement thereon toward and away from said work support, a pair of main tool slides mounted on said feed slide for independent adjustment along parallel paths thereon toward and away from said work support, the amount of adjustment provided for said main tool slides being sufficient to move a gear-like tool carried by either completely out of mesh with the associated section of a herringbone gear work piece a tool sub-slide mounted on each of said main slides and independently adjustable thereon in a direction parallel to the axis of said work support, a tool head mounted for angular adjustment on each of said tool sub-slides about axes radial of the axis of said work support, a rotary tool support on each of said heads for supporting a gear-like finishing tool, means for driving one of said supports in rotation, and means for moving said cross slide in traverse strokes.

3. A machine for finishing herringbone gears comprising a frame, a rotary work support on said frame for supporting a herringbone gear, a cross slide mounted on said frame for traverse substantially parallel to the axis of said work support, a feed slide mounted on said cross slide for movement thereon toward and away from said work support, a pair of main tool slides mounted on said feed slide for independent adjustment along parallel paths thereon toward and away from said work support, the amount of adjustment provided for said main tool slides being sufficient to move a gear-like tool carried by either completely out of mesh with the associated section of a herringbone gear work piece a tool sub-slide mounted on each of said main slides and independently adjustable thereon in a direction parallel to the axis of said work support, a rotary tool support on each of said tool sub-slides for supporting a gear-like finishing tool, motor means for driving said work support in rotation, and means for moving said cross slide in traverse strokes.

4. A machine for finishing herringbone gears comprising a frame, a rotary work support on said frame for supporting a herringbone gear, a cross slide mounted on said frame for traverse substantially parallel to the axis of said work support, a feed slide mounted on said cross slide for movement thereon toward and away from said work support, a pair of main tool slides mounted on said feed slide for independent adjustment along parallel paths thereon toward and away from said work support, the amount of adjustment provided for said main tool slides being sufficient to move a gear-like tool carried by either completely out of mesh with the associated section of a herringbone gear work piece a tool sub-slide mounted on each of said main slides and independently adjustable thereon in a direction parallel to the axis of said work support, a rotary tool support on each of said tool sub-slides for supporting a gear-like finishing tool, means for driving one of said supports in rotation, power means for effecting intermittent feeding advance of said feed slide in timed relation to traverse of said cross slide, and means for moving said cross slide in traverse strokes.

5. A machine for finishing herringbone or double helical gears comprising a frame, a rotary work support on said frame for supporting a gear to be finished, a pair of slides, a first one of said slides being mounted on said frame, the second of said slides being mounted on said first slide, one of said slides being a traverse slide mounted for traverse movement parallel to the axis of said work support, the other of said slides being a feed slide movable toward and away from said work support, a pair of main tool slides mounted on said second slide for independent adjustment along parallel paths thereon toward and away from said work support, the amount of adjustment provided for said main tool slides on said second slide being sufficient to move a gear-like tool carried by either completely out of mesh with the associated section of a herringbone or double helical gear work piece, a tool sub-slide mounted on each of said main tool slides and independently adjustable thereon in a direction parallel to the axis of said work support, a rotary tool support on each of said tool sub-slides for supporting a gear-like finishing tool, means for driving one of said supports in rotation, and means for moving said traverse slide in traverse strokes.

6. A machine for finishing herringbone or double helical gears comprising a frame, a rotary work support on said frame for supporting a gear to be finished, a pair of slides, a first one of said slides being mounted on said frame, the second of said slides being mounted on said first slide, one of said slides being a traverse slide mounted for traverse movement parallel to the axis of said work support, the other of said slides being a feed slide movable toward and away from said work support, a pair of main tool slides mounted on said second slide for independent adjustment along parallel paths thereon toward and away from said work support, the amount of adjustment provided for said main tool slides on said second slide being sufficient to move a gear-like tool carried by either completely out of mesh with the associated section of a herringbone or double helical gear work piece, a tool sub-slide mounted on each of said main tool slides and independently adjustable thereon in a direction parallel to the axis of said work support, a rotary tool support on each of said tool sub-slides for supporting a gear-like finishing tool, means for driving said work support in rotation, and means for moving said traverse slide in traverse strokes.

7. A machine for finishing herringbone or double helical gears comprising a frame, a rotary work support on said frame for supporting a gear to be finished, a pair of slides, a first one of said slides being mounted on said frame, the second of said slides being mounted on said first slide, one of said slides being a traverse slide mounted for traverse movement parallel to the axis of said work support, the other of said slides being a feed slide movable toward and away from said work support, a pair of main tool slides mounted on said second slide for independent adjustment along parallel paths thereon toward and away from said work support, the amount of adjustment provided for said main tool slides on said second slide being sufficient to move a gear-like tool carried by either completely out of mesh with the associated section of a herringbone or double helical gear work piece, a tool sub-slide mounted on each of said main tool slides and independently adjustable thereon in a direction parallel to the axis of said work support, a rotary tool support on each of said tool sub-slides for supporting a gear-like finishing tool, means for driving said work support in rotation, means for moving said traverse slide in traverse strokes, and power means for effecting intermittent feeding advance of said feed slide in timed relation to traverse of said traverse slide.

References Cited in the file of this patent

UNITED STATES PATENTS

| | | |
|---|---|---|
| 2,504,578 | Pelphrey | Apr. 18, 1950 |
| 2,556,142 | McLeod | June 5, 1951 |
| 2,749,802 | Carlsen | June 12, 1956 |